(12) United States Patent
Yonani et al.

(10) Patent No.: US 11,548,188 B1
(45) Date of Patent: Jan. 10, 2023

(54) VENEER STONE SAW WITH ROTARY FEED

(71) Applicant: Yonani Industries Ltd., Kadima (IL)

(72) Inventors: Ronen Yonani, Kadima (IL); Michael Vainberg, Petach Tikwa (IL)

(73) Assignee: Yonani Industries Ltd., Kadima (IL)

( * ) Notice: Subject to any disclaimer, the term of this patent is extended or adjusted under 35 U.S.C. 154(b) by 841 days.

(21) Appl. No.: 16/384,167

(22) Filed: Apr. 15, 2019

Related U.S. Application Data

(60) Provisional application No. 62/781,894, filed on Dec. 19, 2018, provisional application No. 62/723,078, filed on Aug. 27, 2018.

(51) Int. Cl.
*B28D 7/04* (2006.01)
*B28D 1/04* (2006.01)
*B28D 1/00* (2006.01)

(52) U.S. Cl.
CPC ............. *B28D 7/04* (2013.01); *B28D 1/005* (2013.01); *B28D 1/04* (2013.01)

(58) Field of Classification Search
CPC . B28D 1/04; B28D 1/047; B28D 1/24; B28D 1/005; B28D 7/04; B28D 7/043; B23D 47/047
USPC .................................................. 125/13.01, 35
See application file for complete search history.

(56) References Cited

U.S. PATENT DOCUMENTS

| | | | | |
|---|---|---|---|---|
| 2,382,257 A | * | 8/1945 | Ramsay | B28D 1/003 83/13 |
| 2,640,380 A | * | 6/1953 | Ostrochovsky | B29D 19/04 79/18 |
| 3,089,478 A | * | 5/1963 | Jefferson | B28D 7/043 125/35 |
| 3,844,269 A | * | 10/1974 | Rater | B23D 47/047 125/35 |
| 4,753,047 A | * | 6/1988 | Yoshikawa | B24B 41/005 451/331 |
| 4,872,289 A | * | 10/1989 | Yukawa | B28D 7/04 451/10 |
| 5,413,522 A | * | 5/1995 | Husson | B24B 49/183 451/6 |
| 7,219,585 B1 | * | 5/2007 | Kelly | B27B 5/188 125/35 |
| 7,771,249 B2 | | 8/2010 | Schlough et al. | |
| 8,028,686 B2 | | 10/2011 | Gomez | |
| 8,100,740 B2 | | 1/2012 | Schlough et al. | |
| 8,506,353 B2 | | 8/2013 | Schlough et al. | |
| 9,186,815 B2 | | 11/2015 | Schlough et al. | |
| 10,005,203 B1 | * | 6/2018 | Milholen | B28D 1/046 |
| 2005/0092154 A1 | * | 5/2005 | Higuchi | B28D 1/04 83/523 |
| 2018/0339391 A1 | * | 11/2018 | Inami | B24B 27/0675 |

FOREIGN PATENT DOCUMENTS

EP 1570935 A1 * 9/2005 ........... B23D 47/047

* cited by examiner

*Primary Examiner* — Orlando E Aviles
*Assistant Examiner* — Marcel T Dion
(74) *Attorney, Agent, or Firm* — Bachman & LaPointe, P.C.

(57) ABSTRACT

An apparatus for cutting workpieces has a saw and a carousel. The carousel has a plurality of workpiece-holding pockets and is mounted for rotation about a carousel axis to pass the workpiece-holding pockets from a first position remote of the saw through at least a second position proximate the saw.

20 Claims, 8 Drawing Sheets

VENEER STONE SAW WITH ROTARY FEED

CROSS-REFERENCE TO RELATED APPLICATIONS

Benefit is claimed of U.S. Patent Application No. 62/723,078 (the '078 application), filed Aug. 27, 2018, and entitled "Cutting Apparatus for Stones or Other Heavy/Bulky Items" and U.S. Patent Application No. 62/781,894 (the '894 application), filed Dec. 19, 2018, and entitled "Veneer Stone Saw with Rotary Feed", the disclosures of which are incorporated by reference herein in their entireties as if set forth at length.

BACKGROUND

The disclosure relates to cutting of stone. More particularly, the disclosure relates to cutting veneer stones.

Facing stones are commonly used to cover walls made of other material (e.g., poured concrete, concrete masonry units (CMU), cinder block, and even other materials such as wood). The facing stones typically have an exposed front face which is a split face reflecting the rough texture of having been split from a larger stone or a weathered/worn face such as that of a field stone. The aft/rear face (which faces and is secured to the wall substrate) is typically a sawn face (thus forming a "veneer stone").

Split stones are generally formed as essentially right parallelepipeds typically with top and bottom faces as sawn faces. Lateral end faces may also be sawn or may be split. Field stones may be in their natural state or may have been partially broken from other stones (e.g., a near rectangular field stone of an approximately 2×1 ratio footprint could be broken in half into two stones of approximately square footprint.

U.S. Pat. No. 8,028,686 B2, THIN VENEER STONE SAW, of Gomez, Oct. 4, 2011, shows one example of a veneer saw.

SUMMARY

One aspect of the disclosure involves an apparatus for cutting workpieces. The apparatus comprises: a saw having a saw blade; and a carousel having a plurality of workpiece-holding pockets. The carousel is mounted for rotation about a carousel axis to pass the workpiece-holding pockets from a first position remote of the saw through at least a second position proximate the saw.

In one or more embodiments of any of the foregoing embodiments, the blade is a circular blade mounted for rotation about a saw axis.

In one or more embodiments of any of the foregoing embodiments, a spacing between the saw axis and the carousel axis is adjustable.

In one or more embodiments of any of the foregoing embodiments, the saw axis essentially parallel to the carousel axis.

In one or more embodiments of any of the foregoing embodiments, the carousel comprises a plurality of walls separating the workpiece-holding pockets.

In one or more embodiments of any of the foregoing embodiments, the walls have openings; and the openings are positioned to pass the saw blade during rotation of the carousel.

In one or more embodiments of any of the foregoing embodiments, the carousel axis is 25-65 degrees off-parallel to a base plane of the apparatus.

In one or more embodiments of any of the foregoing embodiments, the saw is height-adjustable to control thickness of sawn workpieces.

In one or more embodiments of any of the foregoing embodiments, the apparatus further comprises: a body; a cover hinged relative to the body; and an opening in at least one of the body and cover exposing the first position.

In one or more embodiments of any of the foregoing embodiments, the apparatus further comprises a stationary shroud surrounding the carousel in a region downstream of the second position and upstream of the first position.

In one or more embodiments of any of the foregoing embodiments, the saw has an electric motor and the carousel has an electric motor.

In one or more embodiments of any of the foregoing embodiments, a controller controls speed of at least one of the saw electric motor and the carousel electric motor.

In one or more embodiments of any of the foregoing embodiments, a method for using the apparatus comprises: running the saw; placing respective said workpieces in respective said workpiece-holding pockets on the carousel while said workpiece-holding pockets are in the first position; and rotating the carousel about the carousel axis to bring said workpieces in said workpiece-holding pockets from the first position through the second position, so as to cause the saw to cut the workpieces.

In one or more embodiments of any of the foregoing embodiments: the workpieces are stones; and the placing respective said workpieces in respective said workpiece-holding pockets places unsawn faces of the respective stones on a plate of the carousel so that the saw cuts opposite the unsawn faces.

In one or more embodiments of any of the foregoing embodiments: each cut workpiece comprises a first piece and a second piece; and the method further comprises removing at least the first piece from the workpiece-holding pocket after passing through the second position.

In one or more embodiments of any of the foregoing embodiments, the method further comprises flipping the second piece in the workpiece-holding pocket.

In one or more embodiments of any of the foregoing embodiments, the saw has an electric motor and the carousel has an electric motor and the method further comprises: detecting a load on the saw motor; and adjusting the speed of the carousel motor in an inverse relation to the load detected on the saw motor.

Another aspect of the disclosure involves an apparatus for cutting heavy workpieces. The apparatus comprises a rotatable cutting blade and a motorized rotatable plate capable of bringing one or more said workpieces into contact with said blade, wherein said blade being positioned in parallel with said plate, and wherein the workpieces being accommodated in respective seats provided on said plate.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
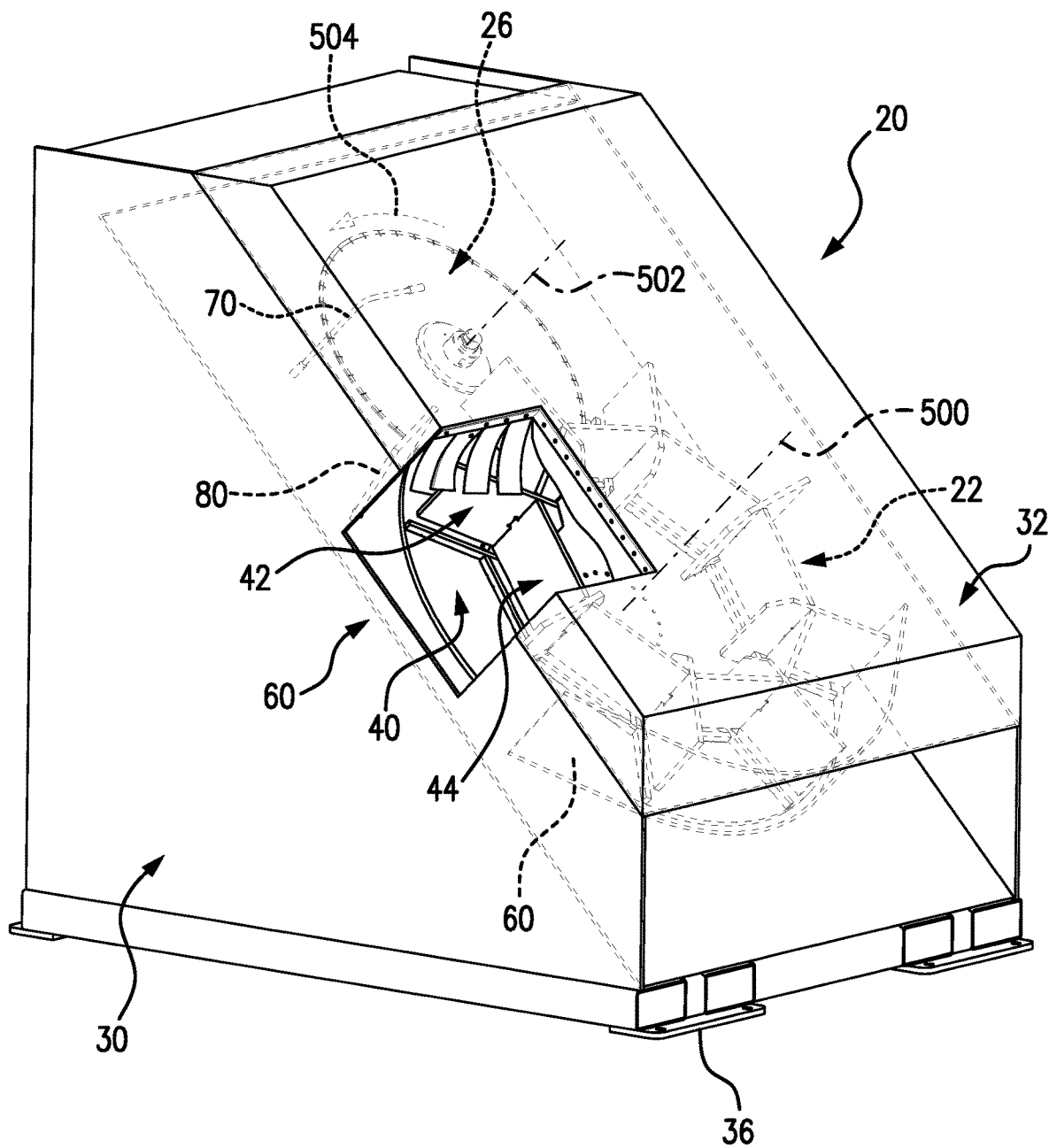
FIG. 1 is a partial x-ray view of a workpiece sawing apparatus showing a saw blade and workpiece carousel hidden.

FIG. 1 shows an apparatus 20 having a carousel 22 mounted for rotation about an axis 500 for conveying workpieces 24 (FIG. 2—e.g., stone) through a range of motion including cutting positions for cutting by a saw 26. The exemplary saw is a circular saw having a circular blade 28 mounted for rotation (direction 504) about a saw axis 502 parallel to the carousel axis 500. The apparatus is thus a variant on the apparatus of the '078 application.

The apparatus has a main body section 30 and a hinged cover 32. The main body section mounts the saw and carousel. A bottom 36 of the main body section may define a base plane and rest atop a support surface such as ground or a factory floor. There may be additional features such as adjustable feed for compensating for support surface irregularities or departures from true horizontal.

Figure 3:
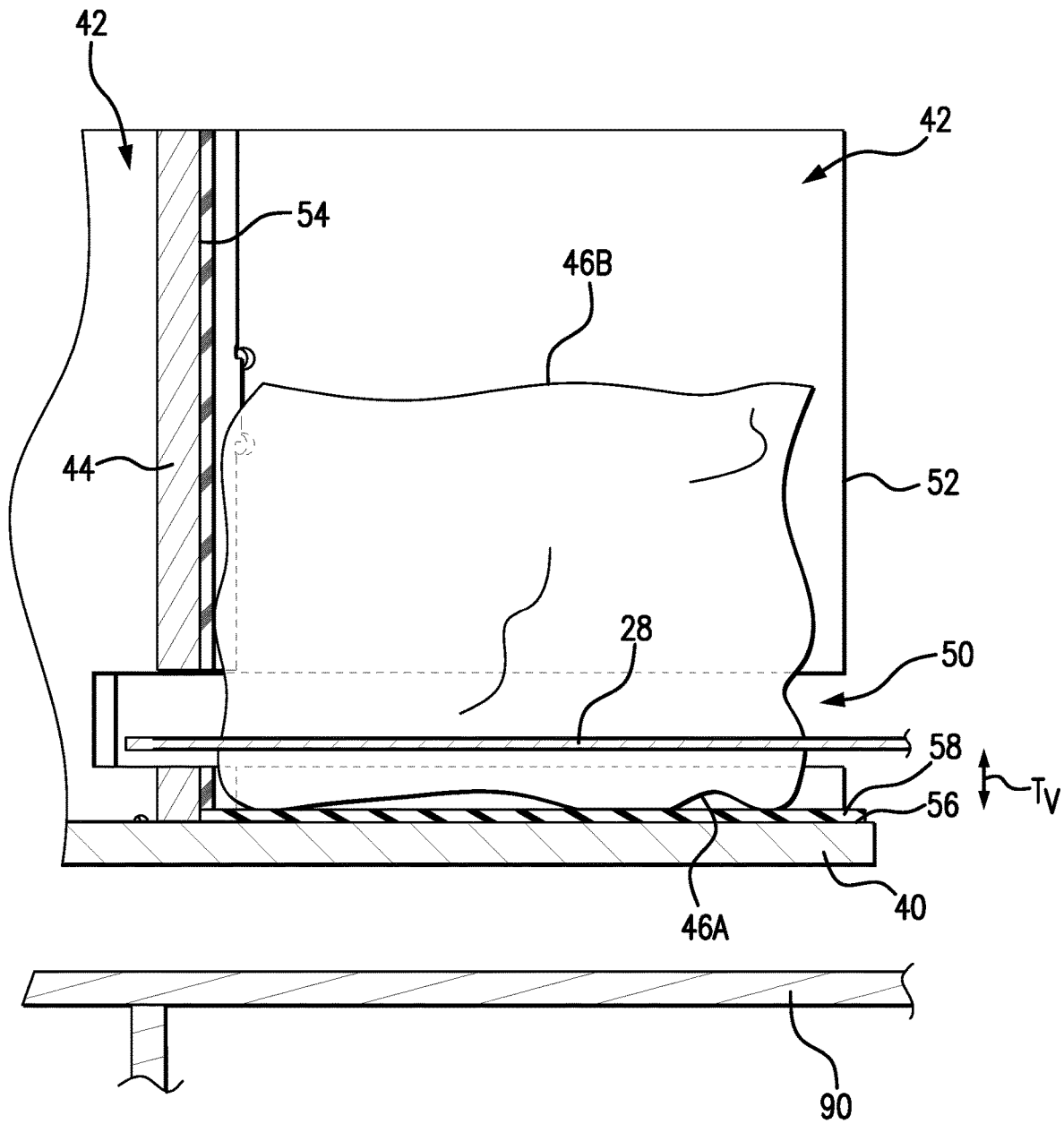
FIG. 3 is a sectional view through a cutting location apparatus of FIG. 2 taken along line 3-3.

As does the '078 application, the carousel 22 has a base plate 40 (e.g., circular) and a plurality of walls 42, 44 separating individual seatings 46 (compartments/seats/pockets) each pocket is open radially outward but has an inner diameter (ID) wall surface (of wall 44) and a pair of circumferential end wall surfaces. The exemplary circumferential end wall surfaces are surfaces of radially-extending walls 42 with one surface of a given wall being along one compartment and the opposite surface of that wall being along the next compartment. Exemplary radial wall structures 42 extend radially inward from the ID wall structures 44 to connect to the base plate and allow the presence of slots 50 (FIG. 3) extending radially inward from the OD end 52 of the radial walls past the ID wall 44 outer surface 54 thus essentially segmenting the ID wall 44 to allow the blade to pass completely through the pocket 46 during the traversal of the pocket.

The upper surface 56 of the base plate 40 as well as the wall surfaces may have a cushion/friction layer 58 (e.g., rubber) to help retain the stones in place. In the exemplary embodiment, stones are loaded (e.g., manually by a user) through the unloading/loading opening 60 to a pocket in a loading position. The carousel motor (discussed below—e.g., an electric motor or alternatively a hydraulic motor) continuously rotates the carousel to bring the stones (direction of rotation 506) through the cutting position. The stones are placed by the user in the pocket 46 with a face for forming veneer (e.g., a rough face 46A) facing the base plate (contacting the base plate substrate or intervening layer). As the pocket passes through the cutting position, the blade will pass through a lead radial wall of the pocket and begin to cut the stone with the trailing radial wall driving movement of the stone through the cutting position until the stone is fully cut. This leaves a thickness of veneer based upon the height of the blade above the surface 56 of the base plate. This height may be adjustable to determine veneer thickness $T_V$.

Additionally, the spacing of the saw axis 502 and carousel axis 504 may be adjusted (e.g., via moving the saw axis toward or away from the fixed carousel axis). This may accommodate wear of blade teeth or variations in blade diameter. Thus, as the blade wears, the saw axis may be shifted by the user toward the carousel axis to make sure the saw can cut all the way through the stones. In the exemplary embodiment, with continued carousel rotation, the stones pass out of engagement with the saw. They then pass back to the loading/unloading position and opening.

In the exemplary embodiment, the saw and carousel axes are off-vertical and off-horizontal so as to help with the flow of the stone. Exemplary orientations are 25° to 65° off-vertical (thus also off-horizontal and off a base plate of the machine). More particularly, an exemplary orientation is 35° to 55° off-vertical or about 45°. By having the axes only partially off-vertical, gravity still biases the stones against the base plate 40. In the exemplary illustration where the saw is above the carousel and the cutting position includes approximately a twelve-o'clock position, gravity also holds the stone against the ID wall 44 during cutting. As the pocket passes out of engagement with the saw, a stationary outer diameter shroud 60 along the outer diameter of the carousel prevents the stones from falling out of the pockets as the pockets pass from approximately the three-o'clock position back toward the loading/unloading opening in an approximately nine-o'clock position.

In one example, the initially loaded stones may be like field stones having two opposite rough faces 46A, 46B (FIG. 3) desirable for veneer. After a first cut is made, when the stone returns to the loading/unloading position the user may remove a first piece (a veneer piece) whose rough face 46A had been against the plate and flip a remaining second piece to put its rough face 46B against the base plate. The second piece is then passed back through the cutting position to cut a second veneer piece and leave a piece having two sawn faces that may be used for some other purpose. When these two pieces return to the loading/unloading position, the user may remove both and replace with a fresh stone.

Figure 2:
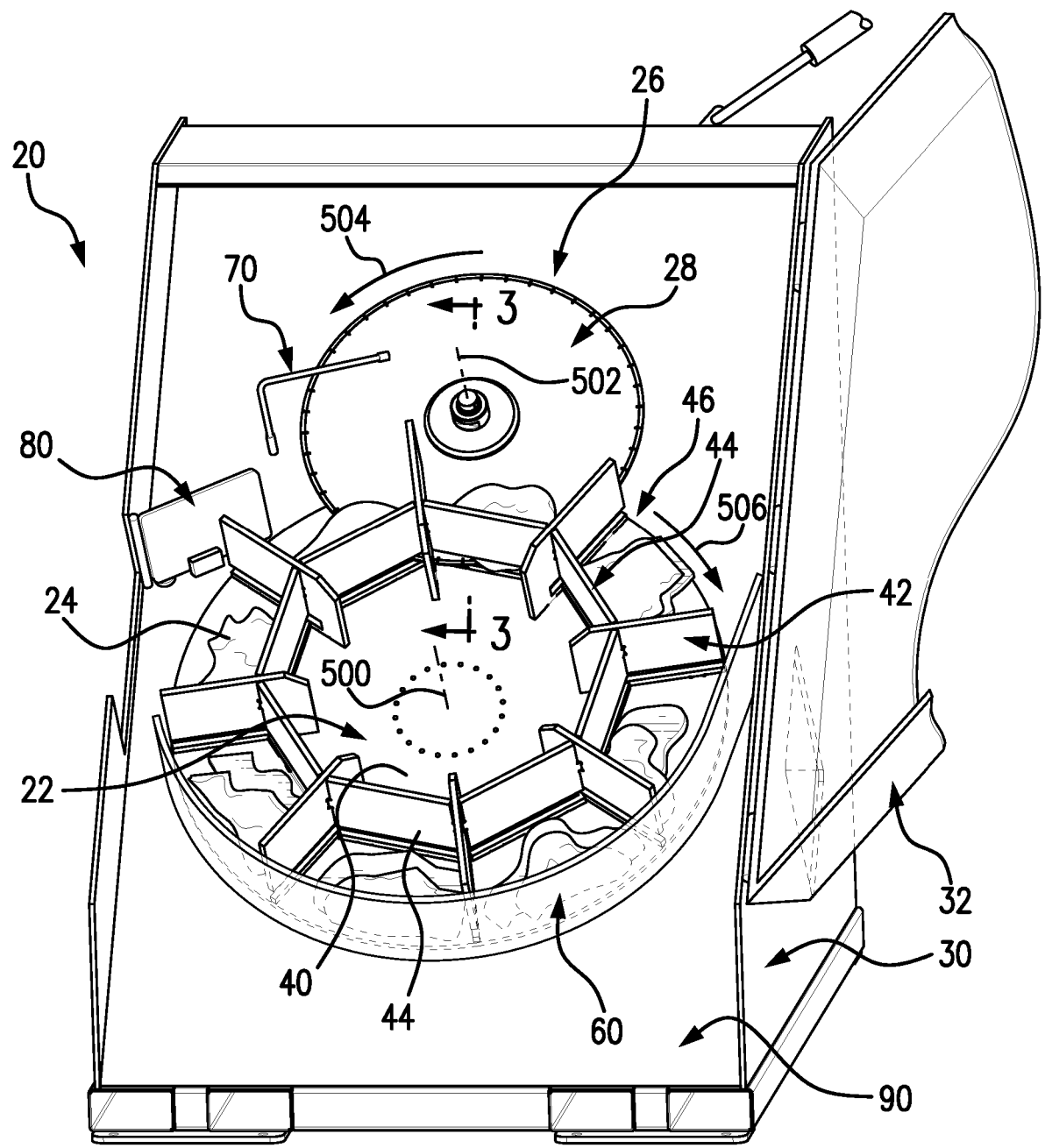
FIG. 2 is a front view of the workpiece sawing apparatus showing saw blade and workpiece carousel with cover/door open and partially cut away out of view.

FIG. 2 also shows a spray bar 70 coupled to a water source (e.g., tank and pump not shown) to spray water on the blade to cool the blade.

FIG. 2 also shows an oversize limit lever 80 to detect the presence of a stone protruding radially beyond the base plate. Such a stone might jam the blade when passing into the cutting position or jam the carousel when passing out of the cutting position (e.g., jamming against the OD shroud). The lever is formed as a paddle with an end normally positioned adjacent the OD of the carousel. If an oversize stone protrudes beyond the OD of the carousel, it will contact and rotate the paddle about an axis (e.g., also parallel to the saw and carousel axes) and trigger a switch (not shown) to turn off power to at least the carousel. This helps prevent the user from loading an oversize stone or loading another stone to protrude from the carousel.

Figure 4:
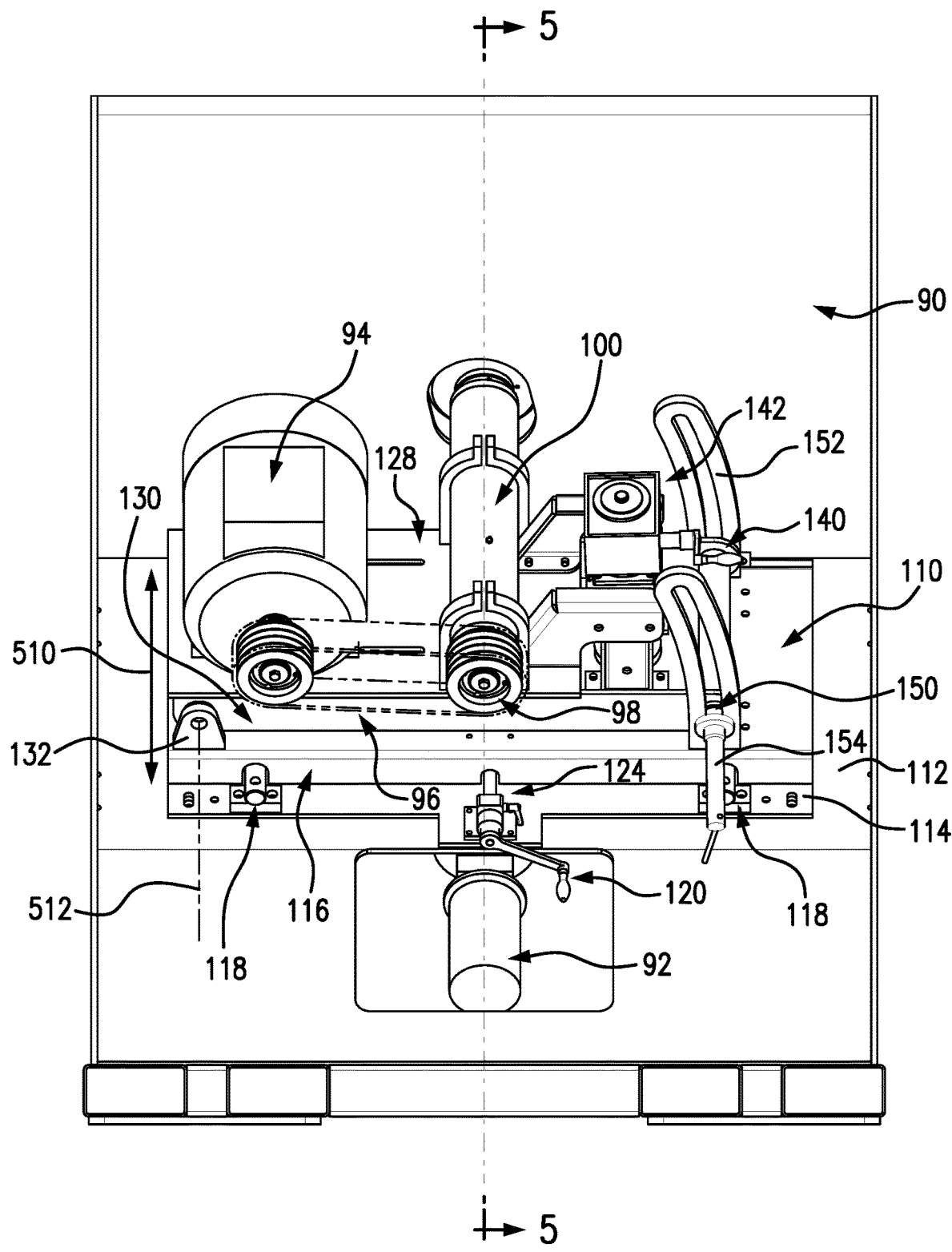
FIG. 4 is a rear interior view of the main section showing a saw drive and mechanisms for moving the saw blade toward and away from an axis of the carousel and toward and away from a plate of the carousel.

FIG. 4 shows various equipment within the main body 30 below/behind a face plate 90 of the main body. The equipment includes a carousel drive motor 92 and a saw drive motor 94. The saw drive motor is coupled by a belt and pulley system 96 to one end of a saw drive shaft 98 shown held via an outer tube/bearing housing 100. The opposite end of the shaft 98 mounts the saw blade.

Figure 5:
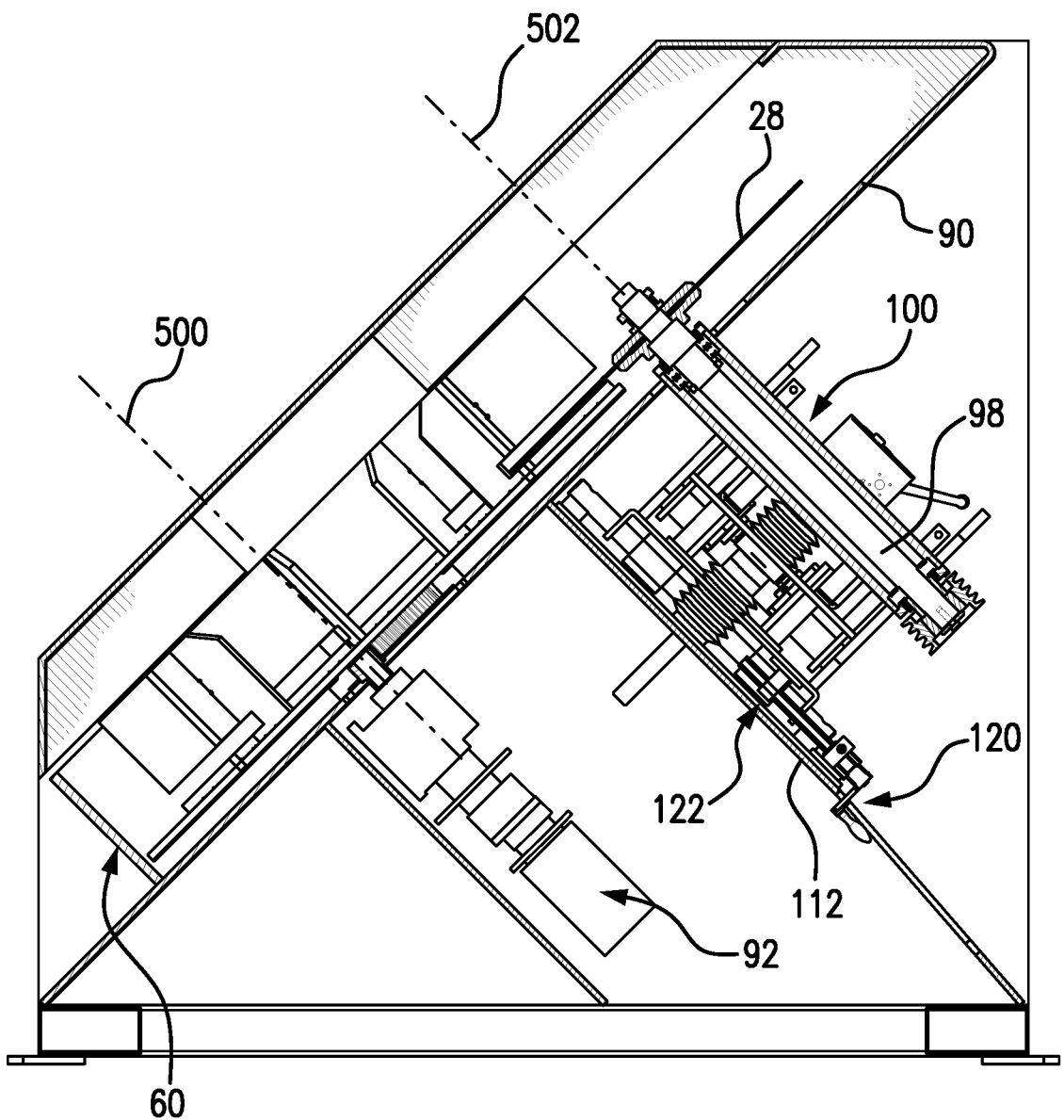
FIG. 5 is a longitudinal vertical sectional view of the apparatus taken along line 5-5 of FIG. 4.

To provide two degrees of movement freedom of the saw (in addition to its rotation) a saw carriage assembly 110 is mounted on a structural plate 112 extending at a right angle to the plate 90. The carriage 110 has a base 114 mounted to the plate 112 and has a first movement section 116 mounted for linear movement in a direction 510 parallel to the plate 112 for shifting the saw blade parallel to its axis 502 to adjust stone thickness. This in-out movement is guided by bushings 118 and driven by a hand crank 120 via a screw and follower (nut) mechanism 122 (FIG. 5). A locking handle 124 may lock and unlock the hand crank 120.

A second movement section 128 (FIG. 4) includes a carriage plate 130 which mounts the saw motor 94 and drive shaft outer tube/bearing housing 100 and is pivotally mounted to the first movement section 116 via pivot blocks 132 for rotation about a pivot axis 512. As discussed above, this movement brings the saw axis 502 toward or away from the carousel axis 500. This movement may be driven by a hand crank 140 connected to a gearbox/screw jack mechanism 142 to pivot the carriage 130 relative to the first movement section 116. Opposite the pivot block, the carriage 130 has a shaft 150 passing through arcuate slots in two guides 152. A locking handle 154 may be used to press the shaft 150 against the guides to lock the shaft to the guides to prevent movement. Thus, in order to move the saw via the handle 140, a user would release the locking handle 154, crank the handle 140 to the desired position, and then reengage the locking handle.

Figure 6:
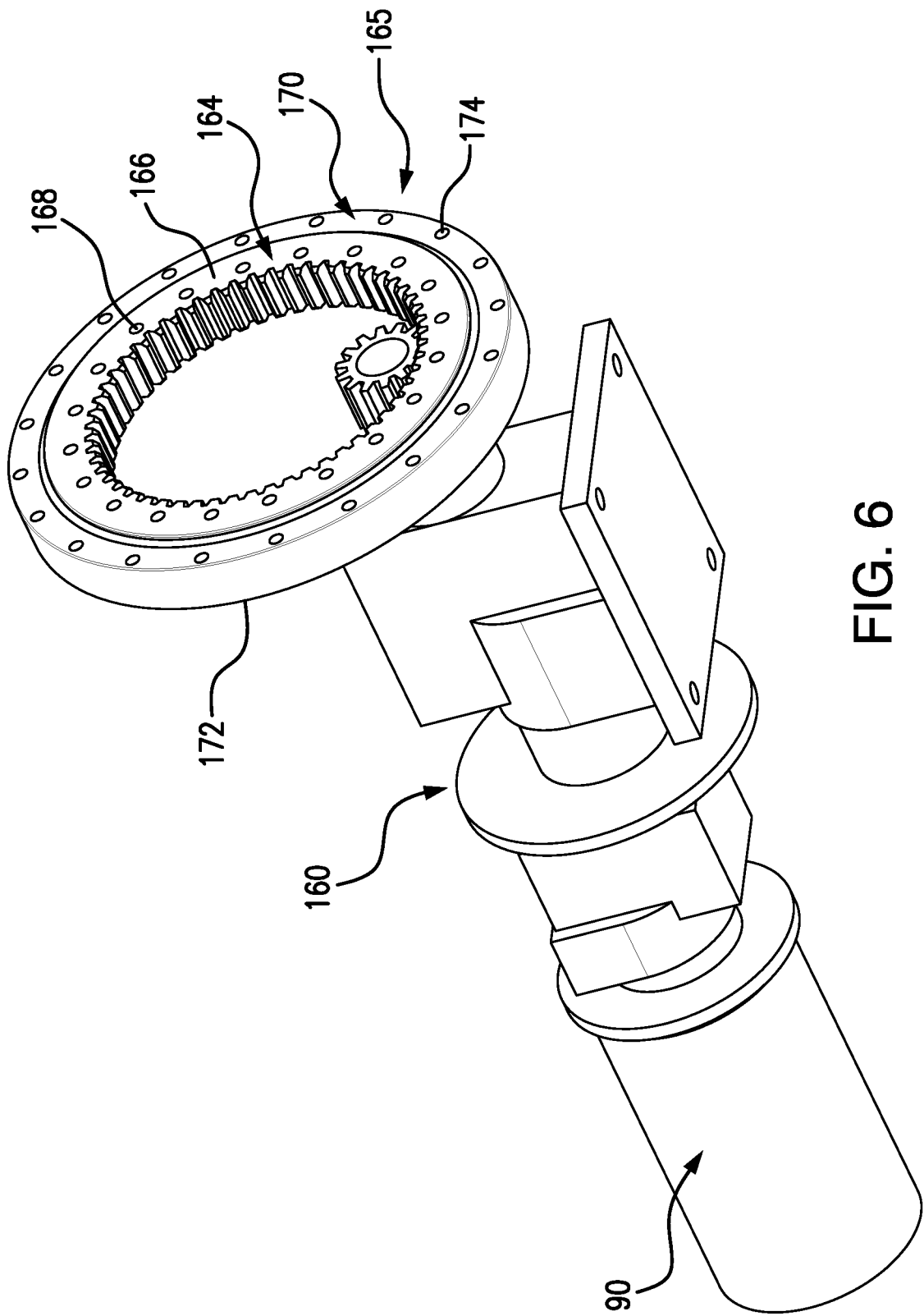
FIG. 6 is an isolated view of a carousel drive mechanism of the apparatus.
Figure 7:
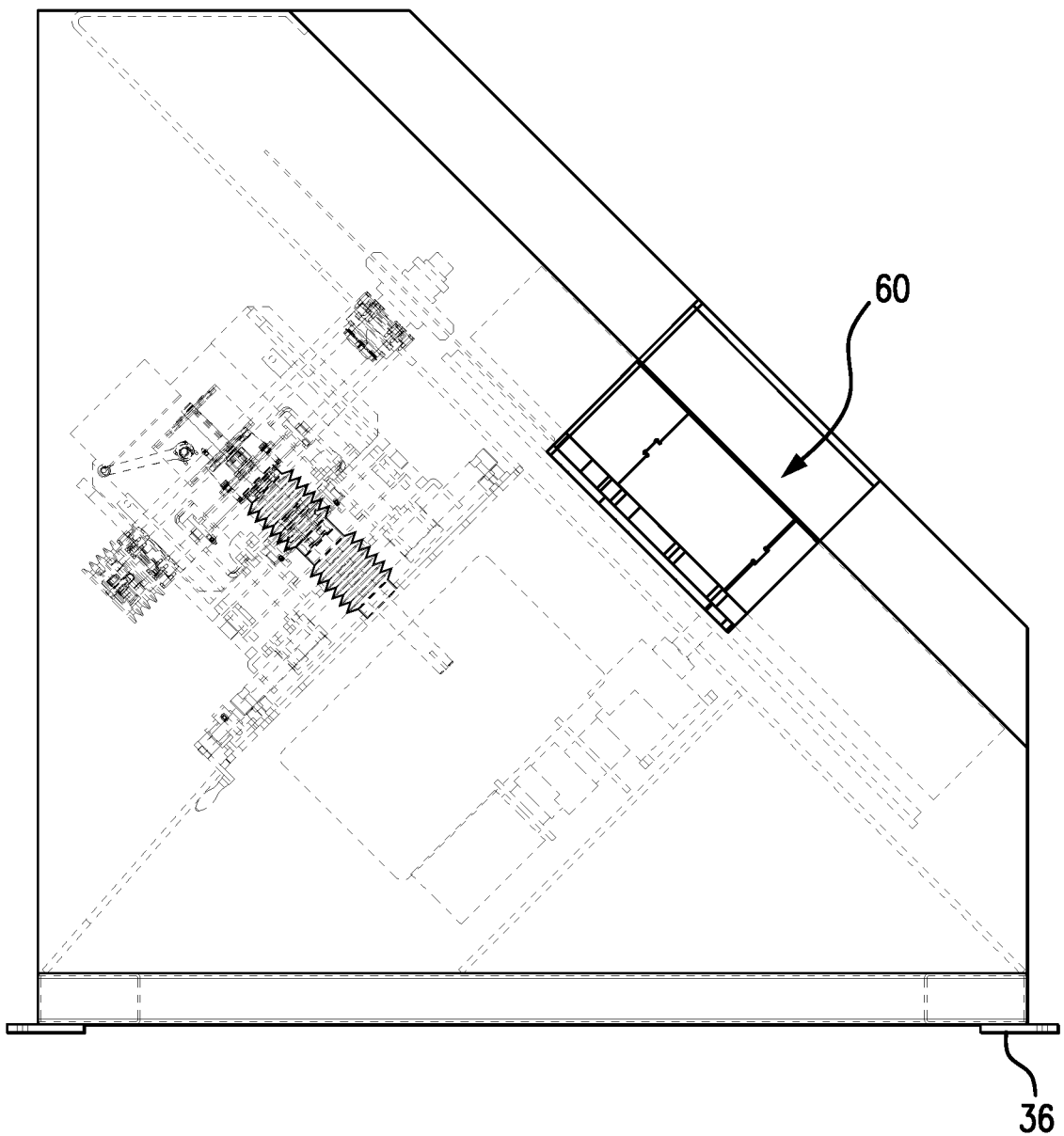
FIG. 7 is an x-ray side view of the apparatus showing a loading/unloading opening.

FIG. 6 shows further details of the carousel drivetrain. The motor 90 connects to a reduction gearbox 92 with an output pinion 162. The pinion engages internal teeth of the inner member 164 of a slewing bearing 165. The underside of the carriage baseplate 40 mounts to the upper surface 166 of the inner member via fasteners in threaded holes 168. The outer member 170 of the slewing bearing is mounted to the body plate 90. For example, an underside 172 of the outer member may sit atop the forward/upper surface of the plate 90 and be secured via fasteners (bolts or screws) through holes 174 (e.g., fasteners passing downwardly through unthreaded holes 174 into threaded holes in the plate 90).

Figure 8:
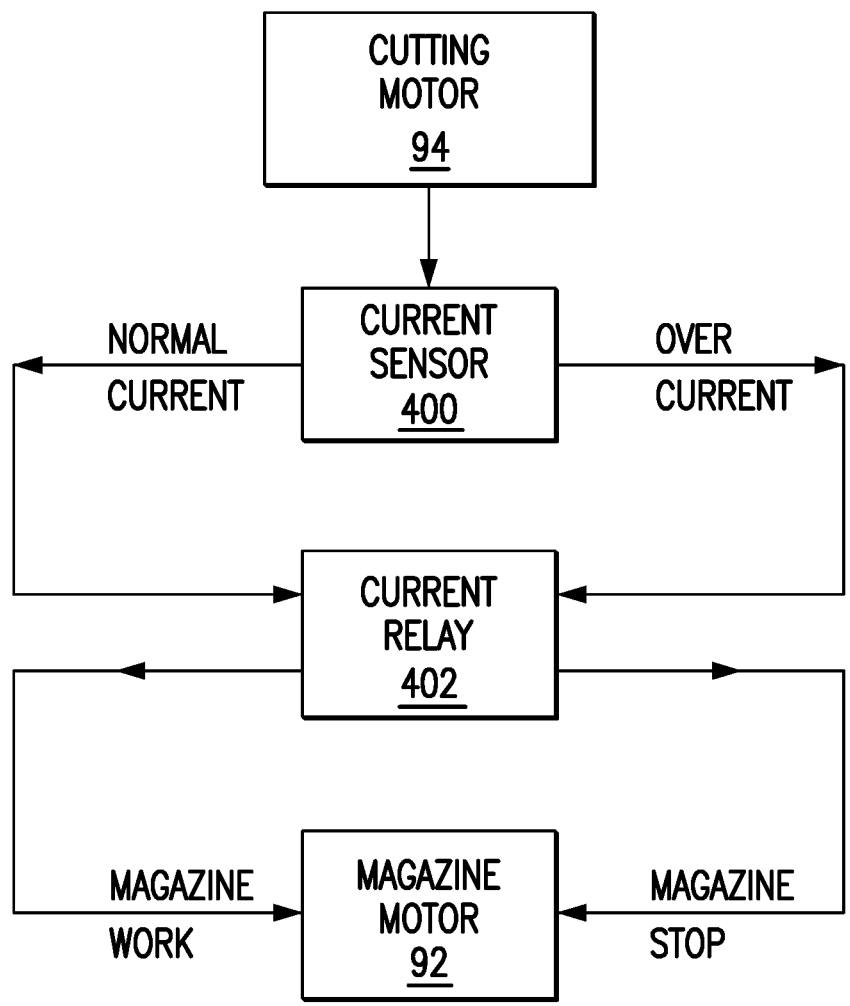
FIG. 8 is a schematic view of a basic motor control system.

FIG. 8 shows a flowchart schematic of a feedback motor control system relating operation of the saw or cutting motor 94 (e.g., an electric motor or alternatively a hydraulic motor) to the carousel or magazine motor 92. In particular, load on the cutting motor is used to control speed of the carousel motor inversely. Thus, if cutting motor load goes up, magazine motor speed decreases. One area of examples involves using a current sensor 400 to determine cutting motor load. This may then control magazine motor speed via a current relay 402. A most basic example simply shuts off power to the carousel motor (e.g., via a current relay) if the current sensor determines saw motor current over a threshold. Alternative implementations involve continuous or stepped decrementing of carousel speed. For example, carousel speed may be decremented by fixed increments until saw motor current is below the threshold. Use of programmable logic controller (PLC) may provide even further refinement of a function representing the inverse relationship. To facilitate this, the carousel motor may be a DC or AC motor (e.g., servomotor) powered by a variable speed drive in turn controlled by the PLC. The saw motor may be a AC motor.

The apparatus may be made using otherwise conventional or yet-developed materials and techniques. Exemplary body and carousel material is welded steel plate.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic saw configuration or for cutting particular stones, details of such configuration or its associated use may influence details of particular implementations. Accordingly, other embodiments are within the scope of the following claims.

What is claimed is:

1. An apparatus for cutting workpieces, the apparatus comprising:
   a saw having a saw blade; and
   a carousel having a plurality of workpiece-holding pockets and mounted for rotation about a carousel axis to pass the workpiece-holding pockets from a first position remote of the saw through at least a second position proximate the saw,
   wherein:
   the workpiece-holding pockets are formed along an upper surface of a plate of the carousel so that gravity biases workpieces in the workpiece-holding pockets against the upper surface of the plate when passing through the first position and the second position;
   the upper surface of the plate is normal to and extending radially from the carousel axis; and
   the blade is a circular blade mounted for rotation about a saw axis, the saw axis is parallel to the carousel axis, and the carousel axis is oriented at an acute angle off-parallel to a base plane of the apparatus.

2. The apparatus of claim 1 wherein:
   a spacing between the saw axis and the carousel axis is adjustable.

3. The apparatus of claim 1 wherein:
   the carousel comprises a plurality of walls separating the workpiece-holding pockets.

4. The apparatus of claim 3 wherein: the walls have openings; and
   the openings are positioned to pass the saw blade during rotation of the carousel.

5. The apparatus of claim 1 wherein:
   the acute angle is 25-65 degrees.

6. The apparatus of claim 1 wherein:
   the saw is height-adjustable to control thickness of sawn workpieces.

7. The apparatus of claim 1 further comprising:
   a body;
   a cover hinged relative to the body; and
   an opening in at least one of the body and cover exposing the first position.

8. The apparatus of claim 1 further comprising:
   a stationary shroud surrounding the carousel in a region downstream of the second position and upstream of the first position.

9. The apparatus of claim 1 wherein:
   the carousel has an inner diameter wall forming surfaces of the workpiece-holding pockets; and
   the carousel is oriented so that gravity also holds workpieces in the workpiece-holding pockets against the inner diameter wall during cutting.

10. The apparatus of claim 1 wherein:
    the saw has an electric motor and the carousel has an electric motor; and
    a controller controls speed of at least one of the saw electric motor and the carousel electric motor.

11. A method for using the apparatus of claim 1 to process a plurality of said workpieces, the method comprising:
running the saw;
placing respective said workpieces in respective said workpiece-holding pockets on the carousel while said workpiece-holding pockets are in the first position; and
rotating the carousel about the carousel axis to bring said workpieces in said
workpiece-holding pockets from the first position through the second position, so as to cause the saw to cut the workpieces.

12. The method of claim 11 wherein:
the workpieces are stones; and
the placing respective said workpieces in respective said workpiece-holding pockets places unsawn faces of the respective stones on the plate of the carousel so that the saw cuts at a predetermined distance from the unsawn faces.

13. The method of claim 11 wherein:
each cut workpiece comprises a first piece and a second piece; and
the method further comprises removing at least the first piece from the workpiece-holding pocket after passing through the second position.

14. The method of claim 13 further comprising:
flipping the second piece in the workpiece-holding pocket so that the rotating passes the second piece back through the second position.

15. The method of claim 11 wherein the saw has an electric motor and the carousel has an electric motor and the method further comprises:
detecting a load on the saw motor; and
adjusting the speed of the carousel motor in an inverse relation to the load detected on the saw motor.

16. An apparatus for cutting heavy workpieces, the apparatus comprising a rotatable cutting blade and a motorized rotatable plate capable of rotating around a rotation axis and bringing one or more said workpieces into contact with said blade, wherein:
said blade is positioned in parallel with said plate; and
the workpieces are accommodated in respective seats provided on an upper surface of said plate so that gravity is the only external force which holds workpieces in the seats against the plate upper surface during cutting, wherein the upper surface of the plate is normal to and extending radially from the rotation axis.

17. The apparatus of claim 16 wherein:
the apparatus has an opening exposing a loading/unloading position for the workpieces;
the rotation axis of the rotatable plate is off-parallel to a base plane of the apparatus so that gravity holds workpieces in the seats against the plate upper surface during rotation from the loading/unloading position, to a cutting position and back to the loading/unloading position.

18. A method for cutting stone using a stone cutting apparatus, the stone cutting apparatus comprising:
a saw having a saw blade; and
a carousel having a plurality of workpiece-holding pockets and mounted for rotation about a carousel axis to pass the workpiece-holding pockets from a first position remote of the saw through at least a second position proximate the saw,
the method comprising: running the saw;
placing respective said initial stones in respective said workpiece-holding pockets on the carousel while said workpiece-holding pockets are in the first position, the placing being of first unsawn faces of the respective initial stones on a plate of the carousel;
rotating the carousel about the carousel axis to bring said initial stones in said workpiece-holding pockets from the first position through the second position, so as to cause the saw to cut the initial stones at a predetermined distance from the first unsawn faces, the cutting cuts each of the initial stone into a first piece and a second piece;
removing at least the first piece from the workpiece-holding pocket after passing through the second position; and
flipping at least one of the second piece in the workpiece-holding pocket to place a second unsawn face of the second piece on the plate so that the rotating passes the second piece back through the second position to cut the second piece at a predetermined distance from the second unsawn face of the second piece.

19. The method of claim 18 wherein the saw has an electric motor and the carousel has an electric motor and the method further comprises:
detecting a load on the saw motor; and
adjusting the speed of the carousel motor in an inverse relation to the load detected on the saw motor.

20. The method of claim 18 wherein the carousel axis is at an angle of 25-65 degrees off-parallel to a base plane of the stone cutting apparatus.

* * * * *